Sept. 30, 1947. J. W. LEIGHTON 2,428,086
ADJUSTABLE THREADED CONNECTION
Filed July 24, 1944
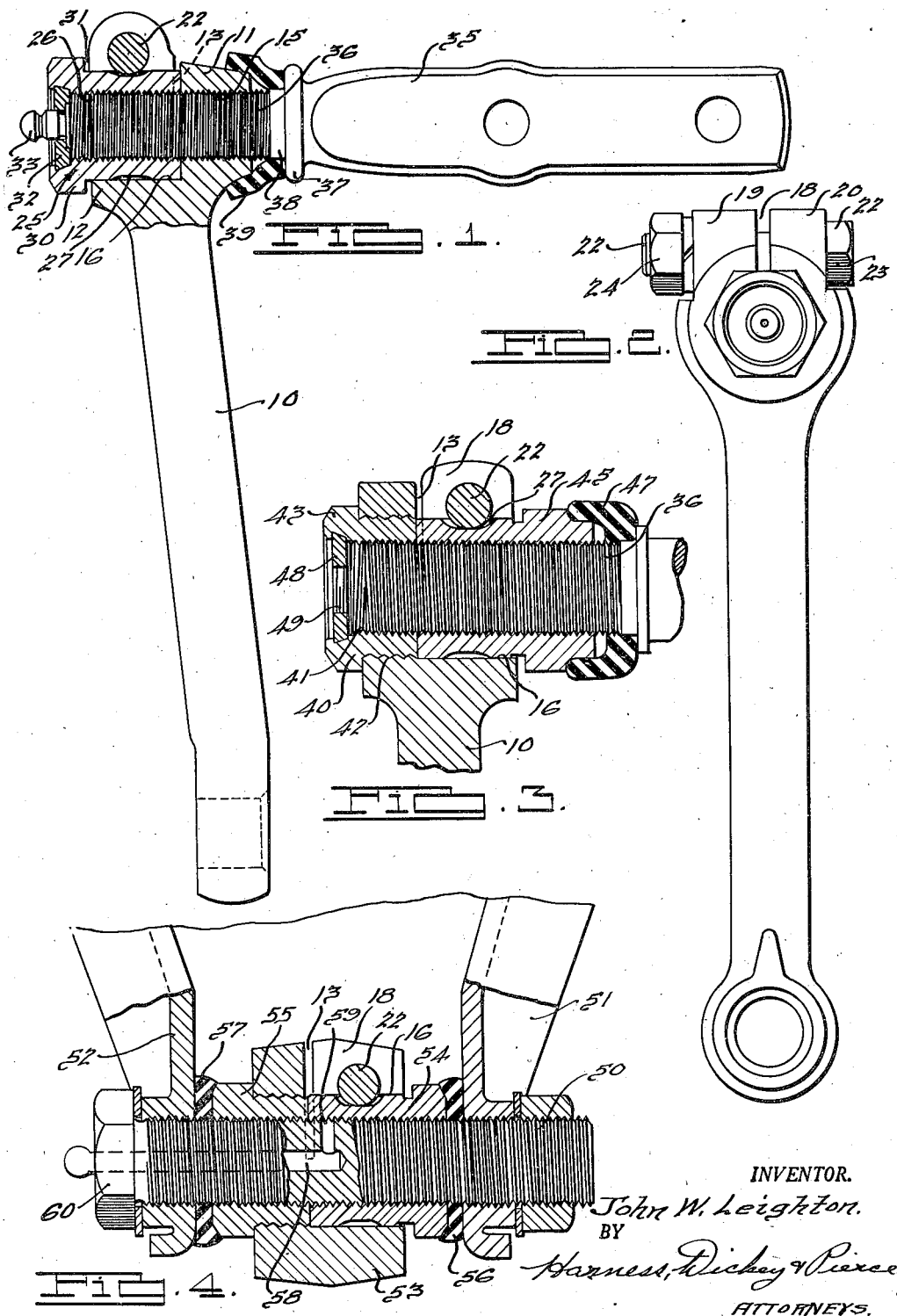
INVENTOR.
John W. Leighton.
BY
Harness, Dickey & Pierce.
ATTORNEYS.

Patented Sept. 30, 1947

2,428,086

UNITED STATES PATENT OFFICE 2,428,086

ADJUSTABLE THREADED CONNECTION

John W. Leighton, Port Huron, Mich.

Application July 24, 1944, Serial No. 546,413

15 Claims. (Cl. 287—96)

The invention relates to pivotal connections and it has particular relation to pivotal connections for use in automobile wheel suspensions.

With respect to pivotal connections of oscillatory character, threaded bearings have widely been used wherein the oscillatory movement occurs about threaded surfaces. While these bearings have been very satisfactory, it is desirable in many instances to reduce the play between threads so as to avoid looseness. Too much looseness may be undesirable and furthermore movement between the connected parts may create noise. Therefore, in certain cases it is desirable to have a rather close fitting threaded bearing and to have some adjusting means for maintaining this rather close fit as wear occurs.

One object of the present invention is to provide an improved single threaded bearing which permits ready adjustments in order to take up clearance between threads such as may occur on account of wear during use of the bearing.

Another object of the invention is to provide a bearing of this character which may be easily manufactured and assembled so that the cost thereof may be reduced to a minimum.

Other objects of the invention will become apparent from the following description, from the drawing to which it relates and from the claims hereinafter set forth.

For a better understanding of the invention reference may be had to the accompanying drawings, wherein:

Figure 1 is a cross-sectional view illustrating a pivotal connection constructed according to one form of the invention and which is employed in connection with two arms or pivotal members;

Figure 2 is an elevational view as seen from the left end of Figure 1;

Figure 3 is a cross-sectional view illustrating another form of the invention;

Figure 4 is a view illustrating one form of the invention as employed in connection with an individual wheel suspension.

Referring to Figure 1, the assembly shown includes an arm 10 having at one end two portions 11 and 12 which are separated partially by a circumferentially extending slot 13 which is substantially semi-circular in length. The portion 11 is provided with a threaded opening 15 and the portion 12 is provided with an opening 16 which is axially aligned with the opening 15. The opening 16 is of larger diameter and is non-threaded so that its inner surface is substantially cylindrical. Hence, both of the openings 15 and 16 in reality constitute portions of a single opening through the upper end of the arm 10 with one portion threaded and the other portion non-threaded and of larger diameter.

The upper side of part 12 of the arm is axially bifurcated or slotted as indicated at 18 and at circumferentially opposite sides of the slot, legs 19 and 20 are provided. These legs provide a means for contracting the upper half of the part 12 and in order to accomplish this contraction or clamping action, a clamping bolt 22 is provided which extends through both legs and has a head 23 on one end and a nut 24 on its other.

A bushing 25 is disposed in the opening 16 and is internally threaded as indicated at 26 with the diameter of the threaded interior equal to the diameter of the threaded opening 15. This bushing has a cylindrical periphery substantially fitting the opening 16 and intermediate the ends of the bushing the outer surface has an annular groove 27 which receives a part of the clamping bolt 22. It should be observed that the groove 27 is of elongated character so as to permit tightening of the bushing while still preventing its removal as long as the clamping bolt 22 is in place.

The bushing 25 at the outer end of the opening 16 has a hexagonal head 30 at the outer side of the part 12 and it will be noted that the head is substantially spaced from the part 12 as indicated at 31 when the inner end of the bushing is in contact with the part 11 or, in other words, in contact with the bottom of opening 16. A Welch plug 32, having a grease fitting 33 closes the outer end of the bushing while permitting the injection of lubricant into the bushing. It will be apparent that the bushing may be prevented from turning by tightening the clamping bolt so as to contract the upper bifurcated portion of the part 12 around the bushing and that when the bolt is loosened the bushing may be turned for adjustment purposes.

A second member 35 adapted to be pivotally connected to the arm 10 has a trunnion 36 which is threaded through the arm part 11 and into the bushing 25. The threads 15 and 26 and those on the trunnion 36 are all of standard type and permit free pivotal movement under normal conditions of the trunnion relative to the arm 10. The member 35 at the inner end of the trunnion has a collar 37 and a cylindrical portion 38 adjacent thereto, and these parts engage one end of a resilient sealing sleeve 39 which, in its opposite end, embraces the part 11. It will be noted that the part 11 projects axially beyond the side of the arm 10 and that the sealing sleeve 39 embraces this projecting portion.

Hence, the threaded bearing at its right end is sealed by the sleeve engaging both the surface 38 and the projecting part 11. Since the inner end of the bushing 25 is in contact with the bottom of the opening 16, lubricant within the threaded openings will not escape and it might be mentioned in this connection that the end surface of the bushing and the surface of the bottom opening 16 may be finished accurately so as to obtain a good surface fit that will prevent escape of lubricant.

In assembling the parts, the bushing is threaded onto the trunnion until its inner end is in contact with the bottom of opening 16 and initially when the bushing is thus threaded into place the desired bearing fit between the threads is obtained. If the clamping bolt is now tightened, the bushing and the opening 15 provide a single threaded opening having a pivotal bearing contact with the trunnion. If at any time the bearing becomes slightly loose so that slight end play occurs between the trunnion and the threads in the openings, the clamping bolt may be loosened and the bushing tightened slightly. With the end of the bushing in contact with the bottom of opening 16 this slight turning of the bushing will take up any axial play between the threads in the bushing and then cause the trunnion to axially advance slightly to take up the axial play between the threads on the trunnion and in the opening 15. The play thus may be reduced or eliminated so as to provide the desired fit between the threads and then the clamping bolt may be tightened to again lock the bushing in place. At all times, the bushing is in contact with the bottom of the opening 16 and hence lubricant will not escape. Thus a single threaded bearing which is easily adjustable and easily lubricated is provided.

The member 35 is adapted to be connected to a vehicle frame and the arm 10 may be used as an idler arm in a steering assembly. It should be apparent, however, that the pivotal connection can be used in other capacities where an oscillatory movement between members is desired. It is particularly advantageous since the position and tightness of the connection may be maintained through adjustments of the bearing and undesired looseness thus avoided.

Referring to Figure 3, a similar pivotal connection is provided but in this case the arm 10 has a relatively short bushing 40 threaded into it with the interior of the bushing threaded as indicated at 41 provide the fixed threaded portion corresponding to the threads 15 in Figure 1. Externally, the bushing has flat, obtuse threads 42 engaging similar threads in the arm and the bushing has a head 43 which, when tightened against the arm, positively locks the bushing in place.

The trunnion is substantially as shown in Figure 1 but in this case instead of being first threaded through the fixed threaded opening, it is threaded through an adjustable bushing which in this case is indicated at 45. This bushing engages the bottom of the opening 16 which, in this case, constitutes the inner end of the bushing 43 and thus lubricant will not escape between the inner ends of the two bushings. Since the bushing 45 is also open at its other end, a resilient sleeve element 47 is provided on the trunnion and this sleeve element embraces the end of the bushing. The outer end of the shorter bushing 43 is closed by means of a Welch plug 48 having a threaded opening 49 for receiving a grease fitting as will be readily understood. Adjustment of the bushing 45 is effected in the same manner as described in connection with the bushing 25 in Figure 1.

In the construction shown by Figure 4, substantially the same type of construction is provided as shown in Figure 3, but instead of a trunnion 36, a threaded pin 50 is used which is connected at its ends to links or arms 51 and 52 of an individual wheel suspension. In this case, the other pivotal member indicated at 53 may comprise a wheel mounting member extending vertically between the upper and lower arms of the suspension. The adjustable bushing is indicated at 54 and is similar to the bushing 45 and takes the place thereof while a bushing 55 which takes the place of bushing 43 is substantially the same as the latter excepting that the grease fitting plug is omitted. Resilient washers 56 and 57 between the ends of the bushings and the arms 51 and 52 serve to seal the ends of the threaded bearing against escape of lubricant. Lubricant may be supplied to the threaded bearing by means of an axial bore 58 in the pin 50 which communicates with a lateral opening 59 in the pin leading to the threads on the pin and the head of the pin indicated at 69 may have a grease fitting for supplying lubricant to the bore 58.

In the several forms of the invention, the single threaded bearing has a normally fixed threaded portion and an adjustable threaded portion in the form of a bushing. Thus play between the threads may be eliminated or changed simply by turning the bushing and then after the adjustment is made the bushing may be clamped or fixed in place so that both threaded portions then are fixed against relative movement. In each assembly the bushing may be clamped easily against movement after the adjustment is made by a single clamping bolt adapted to draw the bifurcated portion about the bushing. It is evident too that in each case the single threaded bearing, even though one part is adjustable, is sealed between the adjustable and fixed portions so that lubricant can not escape between such portions. In general, a simple, inexpensive and readily assembled threaded bearing is thus provided which may be easily adjusted at any time to compensate for thread wear or looseness in the bearing.

Although more than one form of the invention has been illustrated and described in detail, it will be apparent to those skilled in the art that various modifications may be made without departing from the scope of the appended claims.

What is claimed is:

1. A threaded pivotal connection comprising a first member having an opening, one end part of which is threaded and the opposite end part of which is of larger diameter and non-threaded, a second member having an externally threaded trunnion threaded into the opening in the first member, an internally threaded bushing threaded onto the trunnion and disposed in the non-threaded larger part of the opening with its end in contact with the bottom of the latter, and releasable means normally holding the bushing against turning but permitting turning thereof for adjustment purposes.

2. A threaded pivotal connection comprising a first member having an opening defined by two axially joining parts, one of which is threaded and the other non-threaded, a second member having a trunnion projecting into the opening and which has a threaded portion threaded into the threaded part of the opening and a threaded portion in and radially spaced from the sidewall of the non-threaded part, an internally threaded bushing disposed in the non-threaded part of the opening and threaded onto the trunnion portion therein, and means releasably locking the bushing against turning.

3. A threaded pivotal connection comprising a first member having an opening divided axially into two parts, one of which is threaded and the other of which is of larger diameter and non-threaded, a second member having an externally threaded trunnion projecting into the opening and being threaded into the threaded part thereof, an internally threaded bushing disposed in the non-threaded part of the opening and threaded onto the trunnion, and means releasably locking the bushing against turning in its opening.

4. A threaded pivotal connection comprising a first member having an opening divided axially into a threaded part and a non-threaded part of larger diameter than the threaded part, a second member having a threaded trunnion threaded into the smaller threaded part of the opening and projecting into the larger part, an internally threaded bushing threaded on the trunnion and disposed in the larger part of the opening with its inner end seated against the bottom of the latter, and means releasably locking the bushing against turning.

5. A threaded pivotal connection comprising a first member having an opening divided axially into a threaded part and a non-threaded part of larger diameter than the threaded part, the non-threaded part being axially split or bifurcated, a second member having a trunnion threaded into the threaded part of the opening, an internally threaded bushing in the larger part of the opening and threaded onto the trunnion with the end of the bushing contacting the bottom of said larger part of the opening, and releasable means for clamping the bifurcated part about the bushing to normally prevent turning thereof but being releasable to permit turning for adjustment purposes.

6. In a pivotal connection, a member having an opening therethrough and a slot extending transversely and partly through the opening to provide two portions, one of said portions being axially slotted to provide bifurcations.

7. A pivotal connection comprising a pair of members, a threaded pin connected to one member, a pair of internally threaded bushings threaded on the pin and having their adjacent ends substantially abutting, the second member having an opening receiving both bushings, means holding one bushing in the opening, and means on the second member for releasably clamping the second bushing in the opening.

8. A pivotal connection comprising a pair of members, a threaded pin connected to one member, a pair of internally threaded bushings threaded on the pin and having their adjacent ends substantially abutting, the second member having an apertured end portion divided into an annular portion receiving one bushing and a bifurcated portion receiving the other bushing, means holding one bushing against turning in the annular portion, and releasable means for drawing the ends of the bifurcated portion so as to releasably clamp the other bushing against turning relative to the second member.

9. A pivotal connection comprising a threaded pin connected to one member, a pair of bushings threaded onto the pin, a second member having an aperture portion receiving the bushings, said second member having a slot transverse to the aperture and extending partly therethrough so as to divide said portion into two segments and one of said segments being slotted or bifurcated axially in intersecting relation to the first slot, means for holding one bushing in the other segment, and means for releasably holding the other bushing against turning in the slotted segment including clamping means for drawing the bifurcated ends thereof about the bushing.

10. In a pivotal connection, a member having an opening therethrough, a portion of which is threaded and a portion non-threaded, said member having a slot extending transversely and partly therethrough at the junction of the two portions and being bifurcated axially at one side of the slot with the bifurcation intersecting the slot.

11. In a pivotal connection, a member having an opening therethrough, a portion of which is threaded and a portion non-threaded, said member having a slot extending transversely and partly therethrough at the junction of the two portions and being bifurcated axially at one side of the slot with the bifurcation intersecting the slot, a bushing threaded into the first portion, and a second bushing having a non-threaded periphery disposed in the non-threaded portion.

12. In a pivotal connection, a member having an opening therethrough, a portion of which is threaded and a portion non-threaded, said member having a slot extending transversely and partly therethrough at the junction of the two portions and being bifurcated axially at one side of the slot with the bifurcation intersecting the slot, and a clamping bolt connecting the bifurcated parts of the member.

13. A pivotal connection comprising a tubular element, a bushing threaded into and rigidly held in one end portion of the element and being internally threaded, a second internally threaded bushing in the other end portion of the tubular element and the latter portion being axially slotted, means for contracting the slotted portion about the bushing, a shaft or trunnion element threaded through both bushings for pivotal movement on the thread surfaces, and a member rigidly connected to one end of the shaft element and adapted to swing relative to the tubular element.

14. A threaded pivotal connection comprising a first member, means on such member providing a threaded opening and comprising two internally threaded parts adapted to abut each other at their adjacent ends, one of said threaded parts being turnable relative to the other, a second member having a threaded trunnion threaded into both of said parts, and means for holding the turnable part in any position of adjustment to which it is turned relative to the other part.

15. A threaded pivotal connection comprising a first member, means on such member providing a threaded opening and comprising two internally threaded parts adapted to abut each other at their adjacent ends, one of said threaded parts being turnable relative to the other, said member having an opening receiving the turnable part with the wall of the opening slotted axially, a second member having a threaded trunnion threaded into both of said parts, and means for clamping the axially slotted portion of the first member about the turnable part.

JOHN W. LEIGHTON.

REFERENCES CITED

The following references are of record in the file of this patent:

UNITED STATES PATENTS

| Number | Name | Date |
| --- | --- | --- |
| 2,076,852 | Leighton | Apr. 13, 1937 |